United States Patent [19]
Landers et al.

[11] Patent Number: 5,824,169
[45] Date of Patent: Oct. 20, 1998

[54] PNEUMATIC TIRE HAVING IMPROVED WEAR PROPERTIES

[75] Inventors: Samuel Patrick Landers, Uniontown; John Steven Attinello, Hartville; James Christopher Stroble, Kent; Joel Joseph Lazeration, Akron, all of Ohio

[73] Assignee: The Goodyear Tire & Rubber Company, Akron, Ohio

[21] Appl. No.: 376,207

[22] Filed: Jan. 20, 1995

[51] Int. Cl.⁶ .............................. B60C 3/00; B60C 11/01; B60C 11/12; B60C 115/00

[52] U.S. Cl. .................. 152/209 R; 152/209 D; 152/454; 152/DIG. 3

[58] Field of Search ............... 152/209 R, 209 D, 152/DIG. 3, 454

[56] References Cited

U.S. PATENT DOCUMENTS

| | | | |
|---|---|---|---|
| 4,474,223 | 10/1984 | Landers | 152/209 R |
| 5,000,239 | 3/1991 | Brayer et al. | 152/209 R |
| 5,027,876 | 7/1991 | Chrobak et al. | 152/454 |
| 5,109,904 | 5/1992 | Numata et al. | 152/209 R |
| 5,117,886 | 6/1992 | Tokutake | 152/454 |
| 5,176,766 | 1/1993 | Landers et al. | 152/209 R |
| 5,200,006 | 4/1993 | Takehara | 152/454 |
| 5,238,038 | 8/1993 | Glover et al. | 152/454 |
| 5,247,979 | 9/1993 | Asano | 152/454 |
| 5,388,625 | 2/1995 | White | 152/DIG. 3 |

FOREIGN PATENT DOCUMENTS

| | | | |
|---|---|---|---|
| 0508090 | 10/1992 | European Pat. Off. . | |
| 0588623 | 3/1994 | European Pat. Off. . | |
| 612631 | 8/1994 | European Pat. Off. | 152/209 D |
| 60011 | 4/1985 | Japan | 152/209 R |
| 27708 | 2/1986 | Japan | 152/209 R |
| 62-265006 | 11/1987 | Japan | 152/454 |
| 147414 | 6/1990 | Japan | 152/209 R |
| 159804 | 7/1991 | Japan | 152/209 R |
| 239106 | 8/1994 | Japan | 152/209 R |

OTHER PUBLICATIONS

"Patent Abstracts of Japan", vol. 11, No. 392 (M–653), 22 Dec. 1987 & JP–A–62 157810 (Yokohama Rubber Co Ltd:The), 13 Jul. 1987, *abstract*.

"Patent Abstracts of Japan", vol. 15, No. 393 (M–1165), 4 Oct. 1991 & JP–A–03 159804 (Sumitomo Rubber Ind Ltd), 9 Jul. 1991, *abstract*.

*Primary Examiner*—Steven D. Maki
*Attorney, Agent, or Firm*—David E. Wheeler

[57] ABSTRACT

A pneumatic tire having improved wet traction has lugs containing sipes which change direction within the lug and tie bars in the sipes near each point where the sipes change direction. Siping, and the positioning of tie bars, provide means for minimizing the difference of the principle direction of lug stiffness between individual lugs. Also, a tire of the invention has 4 pitch ratios which are distributed around the tire so that extra large pitches are not located next to small pitches.

9 Claims, 5 Drawing Sheets

PNEUMATIC TIRE HAVING IMPROVED WEAR PROPERTIES

BACKGROUND OF THE INVENTION

The invention relates to pneumatic tires which have improved wet traction and handling characteristics as well as improved noise and irregular wear characteristics.

This application is related to U.S. application Ser. No. 08/359,103, filed Dec. 19, 1994, which is a divisional application of U.S. Ser. No. 08/181,728, which is a divisional of U.S. Ser. No. 955,961, now U.S. Pat. No. 5,327,952, which is a CIP of U.S. Ser. No. 666,811, filed Mar. 8, 1991, and now abandoned. This application is also related to U.S. Pat. Nos. 5,358,022; 5,176,766; 5,353,854, and co-pending application Ser. No. 666,815, filed Mar. 8, 1991.

Hydroplaning of tires on wet pavement has long been a problem in the prior art. Hydroplaning is caused by a tire when running on wet pavement, because the tire pushes water in front of it as it advances, until the back pressure of the water is sufficient to lift the tire off the road. The pressure of the water is a function of the depth of the water and the speed of the tire. Various tire designs, adapted to channel water away from the tire, and thereby maintain rubber contact with the road, have been tried by the prior art to correct this problem. Although prior art rain tire designs have improved wet traction, it is a continuing goal in the art to further improve wet traction.

It is an object of the present invention to provide a pneumatic tire having improved wet traction while having good handling, improved noise and improved irregular wear characteristics. Other objects of the invention will be apparent from the following description and claims.

Definitions

"aquachannel" refers to an extra wide circumferential groove with angled (non parallel), rounded groove walls designed specifically to channel water out of the footprint contact patch of the tire.

"Aspect Ratio" of the tire means the ratio of its section height to its section width.

"Bead" means that part of the tire comprising an annular tensile member wrapped by ply cords and shaped, with or without other reinforcement elements such as flippers, chippers, apexes, toe guards and chafers, to fit the design rim.

"Contact Patch" refers, in footprints separated into two or more portions by wide void areas, to those portions of the footprint that maintain contact with the pavement.

"Carcass" means the tire structure apart from the belt structure, tread, undertread, and sidewall rubber over the plies, but including the beads.

"Crown" refers to the circumferentially outermost portion of the carcass substantially within the width limits of the tread.

"Design Net-to-gross" refers to the undeflected tread as designed and molded and is the calculated ratio of the expected ground contacting surface area of the tread, excluding groove void area, to the total expected tread footprint area including the groove void area.

"Design rim" means a rim having a specified configuration and width.

"Directional tread" refers to a tread design which has a preferred direction of rotation in the forward direction of travel.

"Equatorial plane (EP)" means the plane perpendicular to the tire's axis of rotation and passing through the center of its tread.

"Footprint" means the contact patch or area of contact of the tire tread with a flat surface at zero speed and under design load and pressure.

"Footprint Net-to-gross" refers to the actual footprint of a deflected tire and is the ratio of the ground contacting surface area of the tread to the total tread footprint area including the groove void area.

"Groove" means an elongated void area in a tread that may extend circumferentially or laterally about the tread in a straight, curved, or zig-zag manner. Grooves ordinarily remain open in the tire footprint. Circumferentially and laterally extending grooves sometimes have common portions and may be subclassified as "wide" or "narrow". Grooves may be of varying depths in a tire. If such narrow or wide grooves are of substantially reduced depth as compared to wide circumferential grooves which they interconnect, they are regarded as forming "tie bars" tending to maintain a rib-like character in the tread region involved.

"Logarithmic spiral" refers to a spiral that has a gradually expanding arc, as opposed to a substantially constant arc as in for example an Archemedic spiral (i.e. as seen in a phonograph record).

"Lugs" refer to discontinuous radial rows of tread rubber in direct contact with the road surface.

"Net-to-gross" refers to the ratio of the ground contacting surface of a tread to the total tread area.

"Normal load and inflation pressure" refers to the specific design inflation pressure and load assigned by the appropriate standards organization for the design rim and service condition for a tire of specific size. Examples of standards are the Tire and Rim Association Manual and the European Tire and Rim Technical Organization.

"Pitch" refers to the circumferential distance from one design feature in the tread pattern to the next similar design feature.

"Pitch boundary" refers to a substantially lateral line in the circumference of the tire that defines the beginning or end of the pitch. The pitch boundary may sometimes be defined by the center of a lateral groove. A pitch boundary "shift" refers to a circumferential displacement of the line.

"Pneumatic tire" means a laminated mechanical device of generally toroidal shape (usually an open-torus) having beads and a tread and made of rubber, chemicals, fabric and steel or other materials. When mounted on the wheel of a motor vehicle, the tire through its tread provides traction and contains the fluid that sustains the vehicle load.

"Radial" and "radially" are used to mean directions radially toward or away from the axis of rotation of the tire.

"Shoulder" refers to the upper portion of sidewall just below the tread edge.

"Sidewall" means that portion of a tire between the tread and the bead.

"Sipes" refer to small slots molded into ribs of a tire that subdivide the tread surface and improves traction characteristics. Sipes tend to close completely in a tire footprint.

"Slots" are elongated void areas formed by steel blades inserted into a cast or machined mold or tread ring. Slots ordinarily remain open in a tire footprint. In the appended drawings, slots are illustrated by single lines because they are so narrow.

"Tie-Bar" refers to an extra thickness of rubber at the bottom of a slot such that, in the locations where the extra rubber is present, the slot depth is less than the slot depth at all other locations. Tie-bars stabilize a lug by limiting the independent movement of two portions of a lug that are separated by slots, while traction properties that are inherent in the use of slots are provided.

"Tread" means a molded rubber component which, when bonded to a tire casing, includes that portion of the tire that comes into contact with the road when the tire is normally inflated and under normal load.

"Tread width" means the arc length of the road contacting tread surface in the axial direction, that is, in a plane parallel to the axis of rotation of the tire.

"Turn-up ply" refers to an end of a carcass ply that wraps around one bead only.

SUMMARY OF THE INVENTION

A pneumatic tire for use on paved surfaces having an aspect ratio of 0.35 to 0.80 has a pair of annular beads, carcass plies wrapped around the annular beads, a tread disposed over the carcass plies in a crown area of the tire, and sidewalls disposed between the tread and the beads. The tread of the tire has a footprint net-to-gross ratio of 45% to 75%, and lateral grooves intersecting circumferential grooves, intersections of circumferential grooves and lateral grooves define lugs. Individual lugs are traversed by sipes which improve traction, and the difference in direction of principle lug stiffness between each lug is minimized. In a preferred embodiment, the circumferential length of a lug segment in all the lugs is maintained within about 55% of the length of every other lug segment in the tread.

In illustrated embodiments, the tread is divided into 55 to 65 pitches comprising 4 different pitch sizes. The pitches are arranged so that there are no small pitches located next to extra large pitches.

In a specific illustrated embodiment, a pneumatic tire for use on paved surfaces has at least one annular aquachannel center groove having the cross section of a curvate-U having a width of about 10 to 25% of total treadwidth based on a footprint of the tire. The center groove has a depth of about 78 to 100% of total tread depth. The tread has lateral grooves which comprise at least a portion of an S-shape wherein a lateral groove has a leading end initiating within the annular center groove and a trailing end terminating in a shoulder area of the tire. The lateral groove intersects circumferential grooves between the center groove and the shoulder, and intersections of circumferential grooves and lateral grooves define lugs. The lugs are traversed by sipes which contain tie bars which stabilize the lug while having the traction properties associated with sipes.

DETAILED DESCRIPTION OF THE INVENTION

Figure 1:
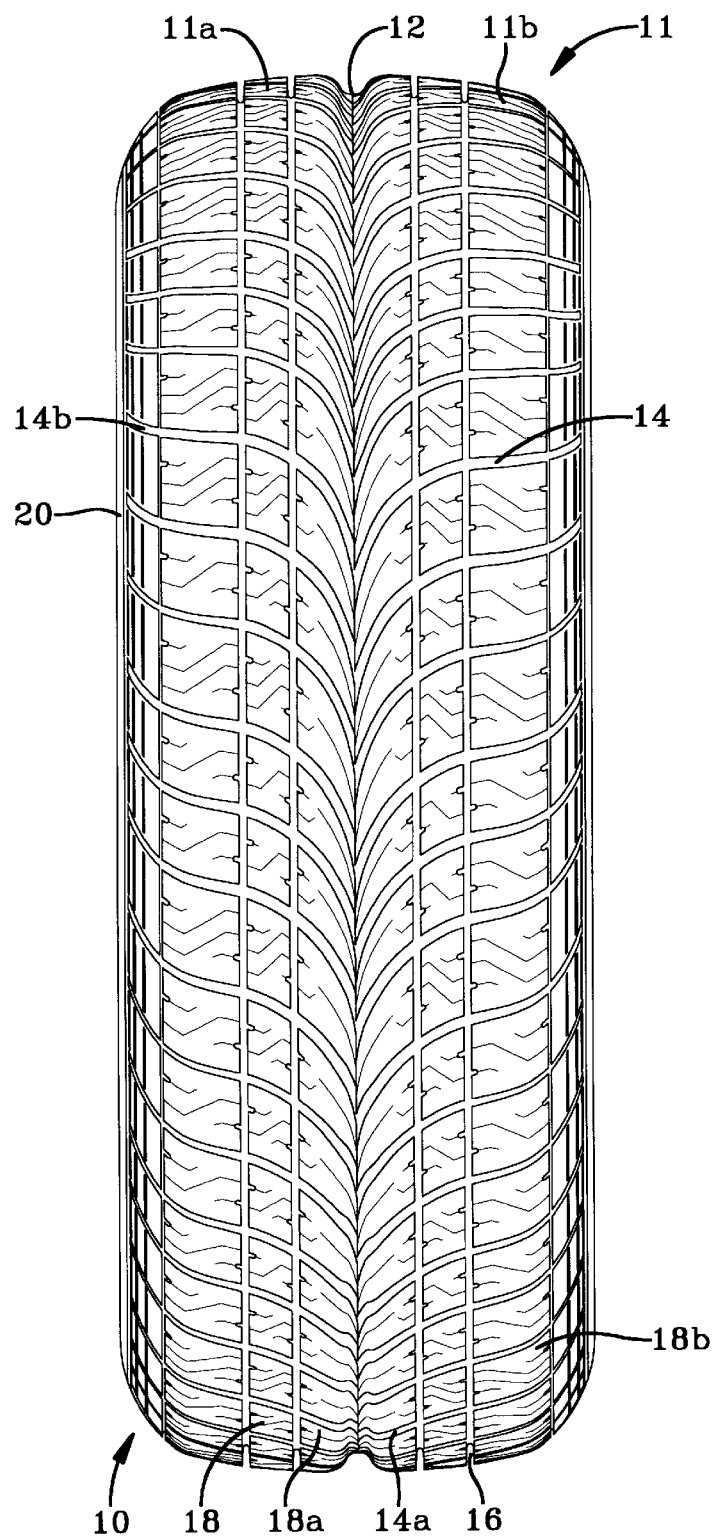
FIG. 1 is a perspective view of one embodiment of a tire of the invention.

With reference now to FIG. 1, tire 10 has a tread portion 11 which is divided into two parts, 11a, 11b by aquachannel center groove 12. Curved lateral grooves 14 initiate in center groove 12 and take an uninterrupted arcuate path to shoulder 20. Circumferential grooves 16 intersect lateral grooves 14 forming lugs 18.

When driving on wet roads, the iniation of the lateral grooves in the center groove substantially facilitates the flow of water from the center groove into the lateral grooves and out of the footprint of the tire through the shoulder. In the illustrated embodiment, the tread pattern is directional and the curvature of the lateral grooves is such that the center or initial portion 14a of a lateral groove is in the leading edge of the footprint, initiating the flow of water before the rest of the lateral groove enters the footprint. As the main portion of the lateral groove 14 enters the footprint, water in lateral groove 14 is expelled through the shoulder area with great force. This, together with the ability of the center groove to accomodate water, helps prevent water back pressure from building up in front of the tire, and helps maintain rubber contact between the tire and the pavement.

In the illustrated embodiments, the tread has a designed total net-to-gross ratio of 30% to 70%, preferably 35% to 65%. In the part of the tread that touches the road (the contact patch, i.e. excluding the center groove), the tread has a design net-to-gross ratio of 45% to 90%, preferably 60% to 75%. In the illustrated embodiment the overall design net-to-gross ratio is about 50%. It is believed that the high traction properties of the tire is partially attributable to the fact that there is a large amount of rubber in contact with the road in the portions of the tire that contact the road.

The design width of center groove 12 may comprise about 15–30% of the total tread width based on the tire design. In the illustrated embodiment, the design width of the center groove is about 25% of the overall tread width.

In a tire footprint under design load and pressure, the width of the center groove is 10%–25%, preferably about 15% of the footprint width, and the overall footprint net to gross is 40% to 70%, preferably 45 to 65%. In the illustrated embodiment the footprint net to gross is about 55%. In the contact patch, the part of the tire that touches the road (the footprint excluding the center groove), the net-to-gross is about 45%–85%, preferably 55% to 75%. In the illustrated embodiment, the contact patch net-to-gross is about 65%.

Figure 4:
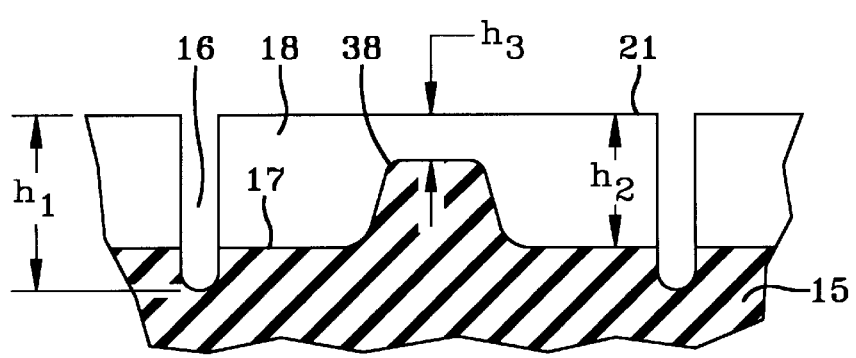
FIG. 4 illustrates the blading of a sipe including a tie bar.

The depth of the center groove may comprise 78% to 100%, preferably 82% to 97% of the total tread depth $h_1$, as shown in FIG. 4 (about 0.91 cm (0.36 in)). By total tread depth it is meant the distance from the tread base 15 to the land area 21 of a lug 18. In the illustrated embodiment the center groove depth is about 95% of the total tread depth. This depth insures that the center groove will be present throughout the tread life of the tire since the tread wear indicators have a height above the tread base of 0.16 cm (0.06 in).

Figure 2:
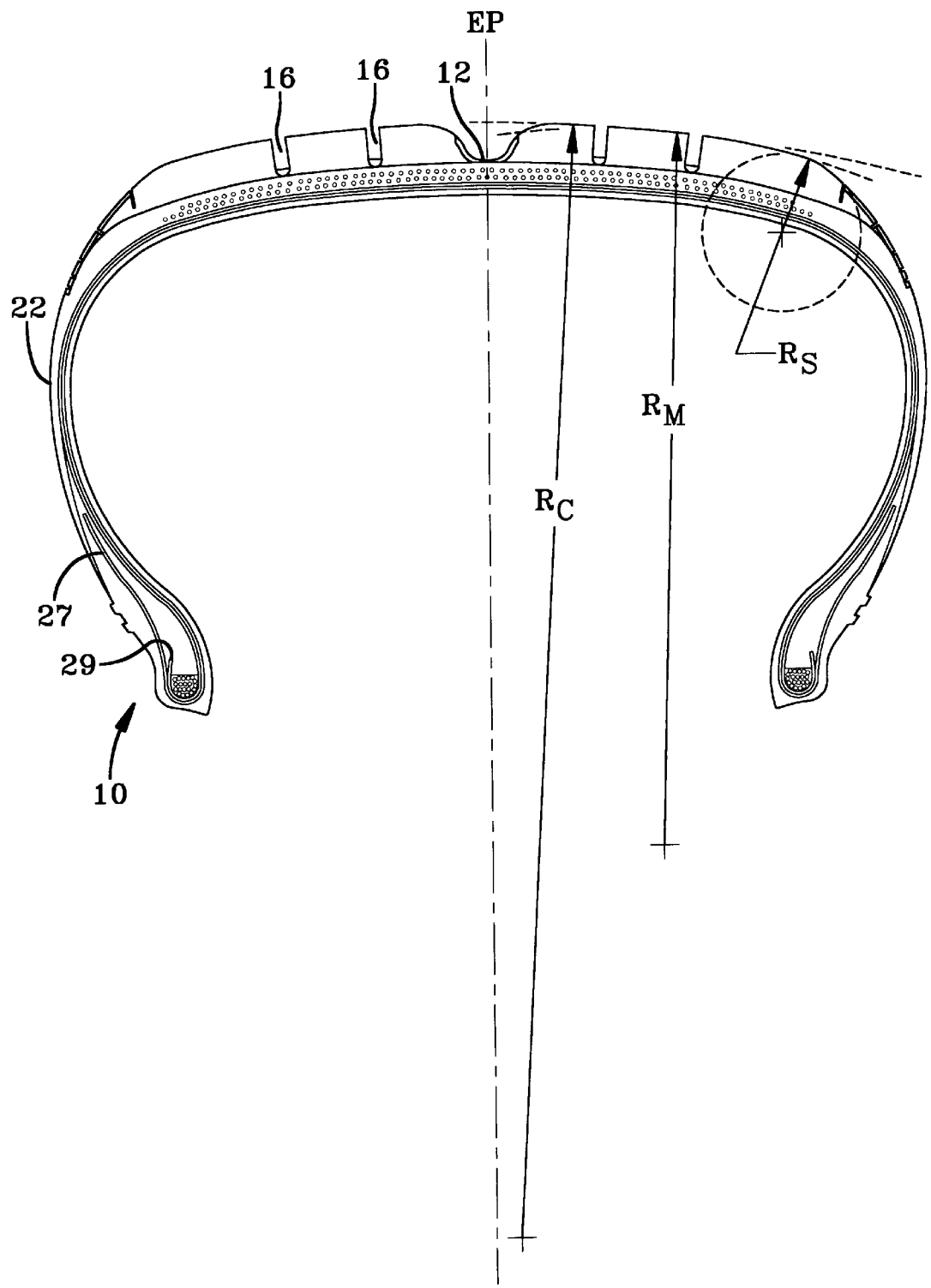
FIG. 2 illustrates a cross section of the tire, disregarding lateral grooves.

It should be noted that the lugs 18a adjacent to center groove 12 are contoured into the center groove, forming a part of the center groove such that the center groove has a curvate U shape (having a rounded bottom and curved sides) substantially as shown in FIG. 2, and that the lateral grooves 14 initiate well into the center groove and have approximately the same depth as the center groove.

The curvate U (rounded) shape of the channel provides for smooth flow of water into the channel and out of the footprint of the tire and for improved lateral traction in the tire.

Those skilled in the art will recognize that flow around circumferential grooves that have sharp sidewalls is turbulent and the flow at any portion of the circumferential groove is dependent on whether a lateral groove is near that portion of the groove.

Also, the curvature of the walls of the curvate U of the center groove is similar to the curvature of the shoulder of the tire and in effect, provides a second shoulder for gripping the road and providing improved lateral control and handling properties. The center groove of the tire specifically described herein is deeper, and the walls are steeper, than the center groove in the tires specifically illustrated in the parent applications.

Figure 3:
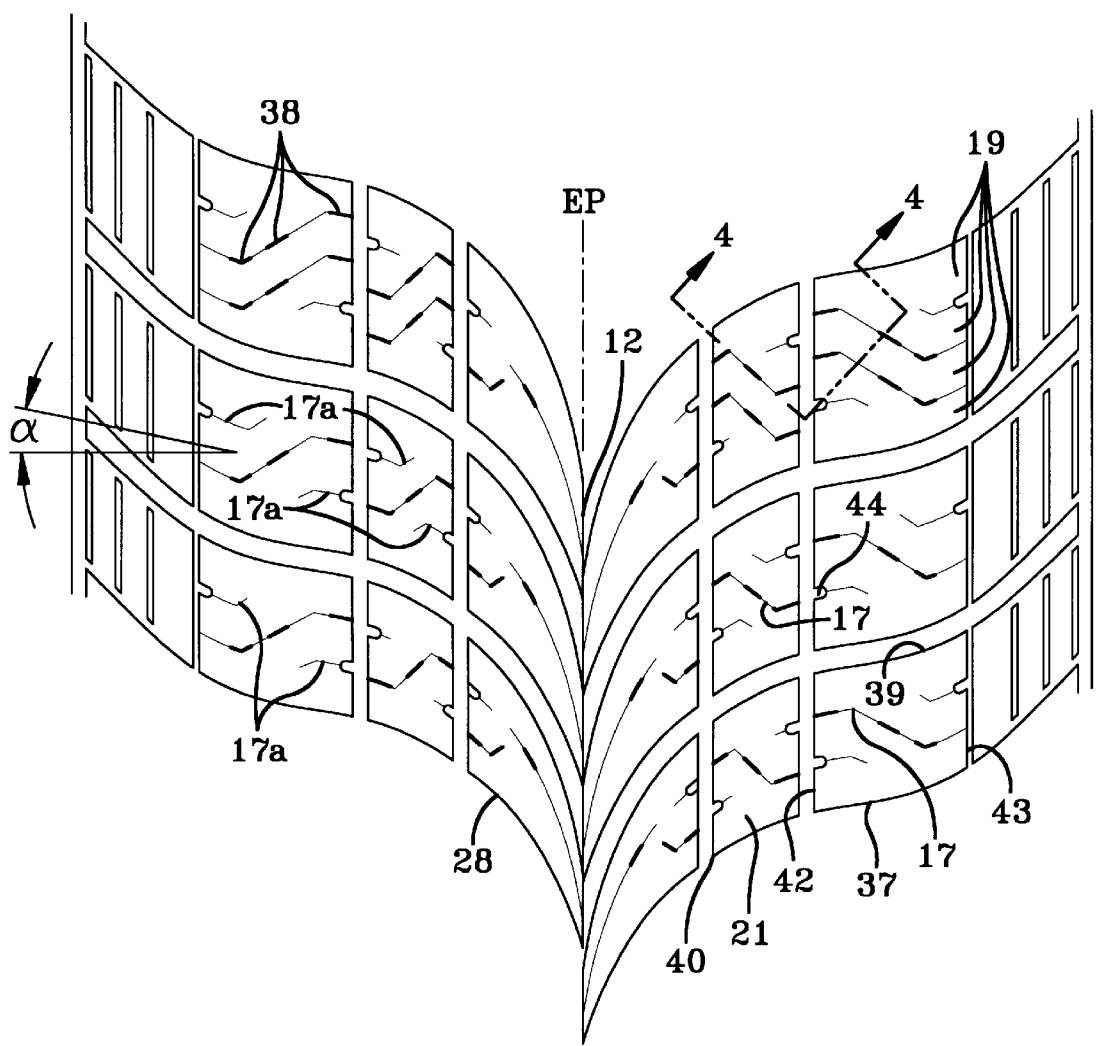
FIG. 3 illustrates a portion of the tread pattern of the tire showing the curved pitch.

As best illustrated in FIGS. 1 and 3, lugs 18 comprise a leading portion 37 and a trailing portion 39 which are separated laterally by sipe 17. Sipe 17 changes direction in each lug at least twice so that in one circumferential edge 42 each lug has a leading portion which is much wider than its concurrent trailing portion (about 1.5 to 2.5 times as wide), and in the other circumferential edge 43 of the lug, the trailing portion is much wider (about 1.5 to 2.5 times as wide) than the leading portion. Tie bars 38 are located near each change in direction of sipe 17. It is believed that this configuration provides a stable lug laterally and a flexible lug circumferentially.

The angles of the sipes across the lugs, and the positions of the notches, are reversed as compared to the tires disclosed in related applications.

The position and length and depth of sipes, and the location and depth of tie bars are varied in an attempt to control the variation of the direction of principle lug stiffness, as defined by the mass moment of inertia around the centroid of the block, so that the difference of lateral lug stiffness between the blocks is minimized as much as possible. The direction of principle lug stiffness is defined as the angle α with respect to the EP of the tire. It is believed that the closer this angle is to 90°, the better the lateral stability and the handling and wear properties of the tire. Since maximum flexibility at an angle of 0° with respect to the EP of the tire facilitates the rolling of the lugs through the footprint, the rolling resistance of the tire may also be improved.

Figure 6:
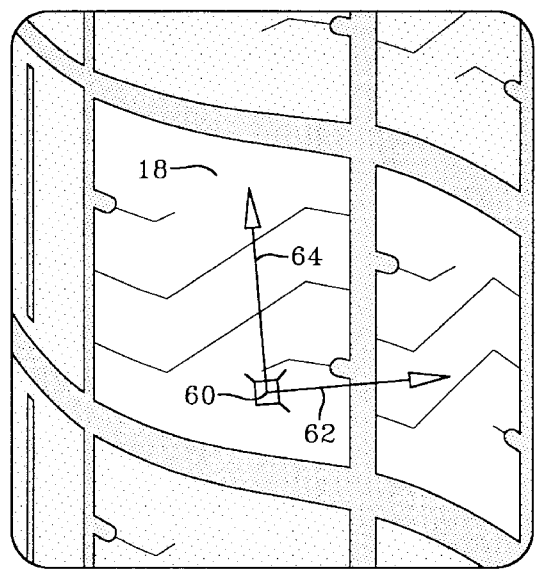
FIG. 6 illustrates the moments of a lug determined theoretically using tire design software.

FIG. 6 illustrates the moments of a lug determined theoretically using tire design software.

The centroid 60 represents the geomtrical center of the segment of lug 18 being considered. Arrow 62 represents the direction of maximum or principle stiffness. Arrow 64 is the line normal to the principle stiffness.

In the illustrated embodiment the lugs follow a curved path and it is not possible to approach a maximum lateral lug stiffness in all the lugs and still maintain substantial lug symmetry, and the approach used herein is believed to work best in the shoulder lugs. The properties of the shoulder lugs are also believed to be most important in contributing to handling and treadwear properties in a tire. In the shoulder lugs, the angle of principle stiffness in the top 25%. of the lug, except for the strips of rubber between the sipes in the extra large lugs is in the range of ±80° to 90°. In a tire size 215/70R15, the angle of principle lug stiffness in the shoulder lugs, except as noted above, is ±85° to 90°. In the majority of lugs of the tire the angle of maximum lug stiffness α is maintained in the range of ±60° to 90°, preferably ±66° to 90°, with respect to the EP of the tire, and a substantial number of lugs have an angle of maximum lug stiffness of ±76° to 90° with respect to the EP of the tire.

In order to help control the angle of lug stiffness, sipes 17a that do not extend through the lug are increased in length in larger lugs, and made shorter in smaller lugs, and are positioned so that, together with the sipes 17 that extend through the lugs, form lug portions 19 that are, as near as possible, the same equivalent stiffness length within each lug. Although it is not possible to make the lug portions equivalent from lug to lug, using this procedure, the difference from lug to lug is minimized as much as possible. In the largest lugs, two parallel sipes 17 may extend through the lug to help meet this goal.

As used herein, "lug portions" refers to segments of solid rubber between a lug edge and a sipe or between two sipes.

With reference now to FIG. 4 in the illustrated embodiment, excluding the portions of lugs curving down into center groove 12, depth $h_2$ of the sipes 17 vary from about 0.38 cm (0.15 in) to about 0.79 cm (0.31 in) deep (measured from the surface of the tread) and the depth $h_3$ of the tie bars 38 vary from about 0.25 cm (0.1 in) deep to about 0.53 cm (0.21 in) deep, depending on the size of the tire and their location.

Tie bars are preferably tapered on each side at an angle of 10° to 20° with respect to vertical, being narrower at the top than at the base.

In general, the depth of the tread also depends on the size of the tire. It is believed that a tire according to the invention may have a ratio of tie-bar-depth/tread-depth ($h_3/h_1$) of 0.22 to 0.50. In a tire size P205/75R15, the ratios may vary from 0.27 to 0.41.

In addition, the widest part of each circumferential edge of a lug is substantially bisected by a notch 44 which substantially parallels sipe 17 in that portion of the lug and may be substantially aligned with the sipe 17 in the adjacent lug. This arrangement divides the circumferential edges of the lug into at least three parts and divides the lug, through its central portion on an angle (having a circumferential vector and a lateral vector), into at least two parts.

The tire of the invention may be made to utilize a β pitch sequence, or any other pitching that is found to be acceptable for a given road surface or purpose.

Pitching as it relates to tires, is well characterized by the prior art as illustrated by U.S. Pat. No. 4,474,223 to Landers and references cited therein.

The tire of the invention may have 3 to 7 pitch sizes.

In illustrated embodiments, each nominal rib of a tire has 55–65 lugs, depending on the size of the tire, that are divided into random pitch arrangements which contain four different sizes of pitches having relative pitch lengths in the ratio of 11, 13, 15 and 17. The pitches are arranged so that a small pitch is not next to an extra large pitch, and there are not equal numbers of each pitch around the tire. A 59 pitch tire, size P205/75R14, for example, has 21 small pitches, 16 medium pitches, 15 large pitches and 7 extra large pitches in the sequence L L X L M M S L S L M M S S S L X L S S M L M S S S S S L L M X M M S S S M X L M S S L X L M S M M X X L L S M S S M, where S represents a small pitch (11), M represents a medium pitch (13), L represents a large pitch (15) and X represents an extra large pitch (17). Because of the curvature of lateral grooves 14, the pitch boundary is curved.

In the embodiment of tire 10, tread portions 11a and 11b are skewed. By skewed, it is meant there is a pitch boundary shift between tread portion 11a and tread portion 11b. Because of the pitch boundary shift, the lugs in the two portions of the tire enter into the footprint at different times reducing the amplitudes of the various sound frequencies generated by the tire during its rotation. It is believed that skewing shifts the phase angles of the sound waves generated by the two portions of the tire reducing tire noise by destructive interference and reduction in the amplitudes of the various frequencies at given instants in time.

Center groove 12 divides tread area 11 into two parts 11a, 11b which each have an S-shaped lateral groove 14. For convenience in defining the various illustrated embodiments, as used herein, S-shaped includes the shape of an S and its mirror image.

The S-shape of the lateral groove extends the lateral groove deep into the shoulder area 20 and causes lateral groove 14b to curve into shoulder 20 at an angle. The curvature of the groove at the shoulder reduces the contact impact of the lugs at the shoulder area as the lug enters the footprint, because of a transitional entering of the lug into the footprint, thereby further reducing energy of impact, distortion, and the noise of the tire.

The S-shaped lateral grooves, and their directional orientation also aid the rolling resistance and braking properties of the tire. When moving in the forward direction, the transitional shape of the lugs and their relationship to one another cause the lugs to move in concert, similar to the stroking of a feather with the grain. On braking, however, the lugs try to separate and spread out, having the same effect as stroking a feather against the grain.

In the present embodiment of the invention, as compared to the tires described in parent applications, the tires are made so that the axially inboard edge of the shoulder lugs 18b are closer to the centerline of the tire, and the axially outboard edge of the center lugs 18a are further away from the centerline of the tire. In effect, the shoulder lugs and center lugs are illustrated as wider than shown in related applications. The wider shoulder lugs reduce the sensitivity of the tire to inflation and load conditions and the wider center lugs reduce the unit pressure on the lugs around the aquachannel center groove 12. Because stresses are spread over a wider area in these critical portions of the tire, the tire is stable and there is less tendency for the lateral grooves to close in the footprint.

Because of the stability of the tread, the footprint of the tire is shorter and more rounded overall than the footprint illustrated in related applications, although retaining the same general shape illustrated in related applications, i.e. comprising two trapezoidal contact patches oriented longer base to longer base.

Figure 5:
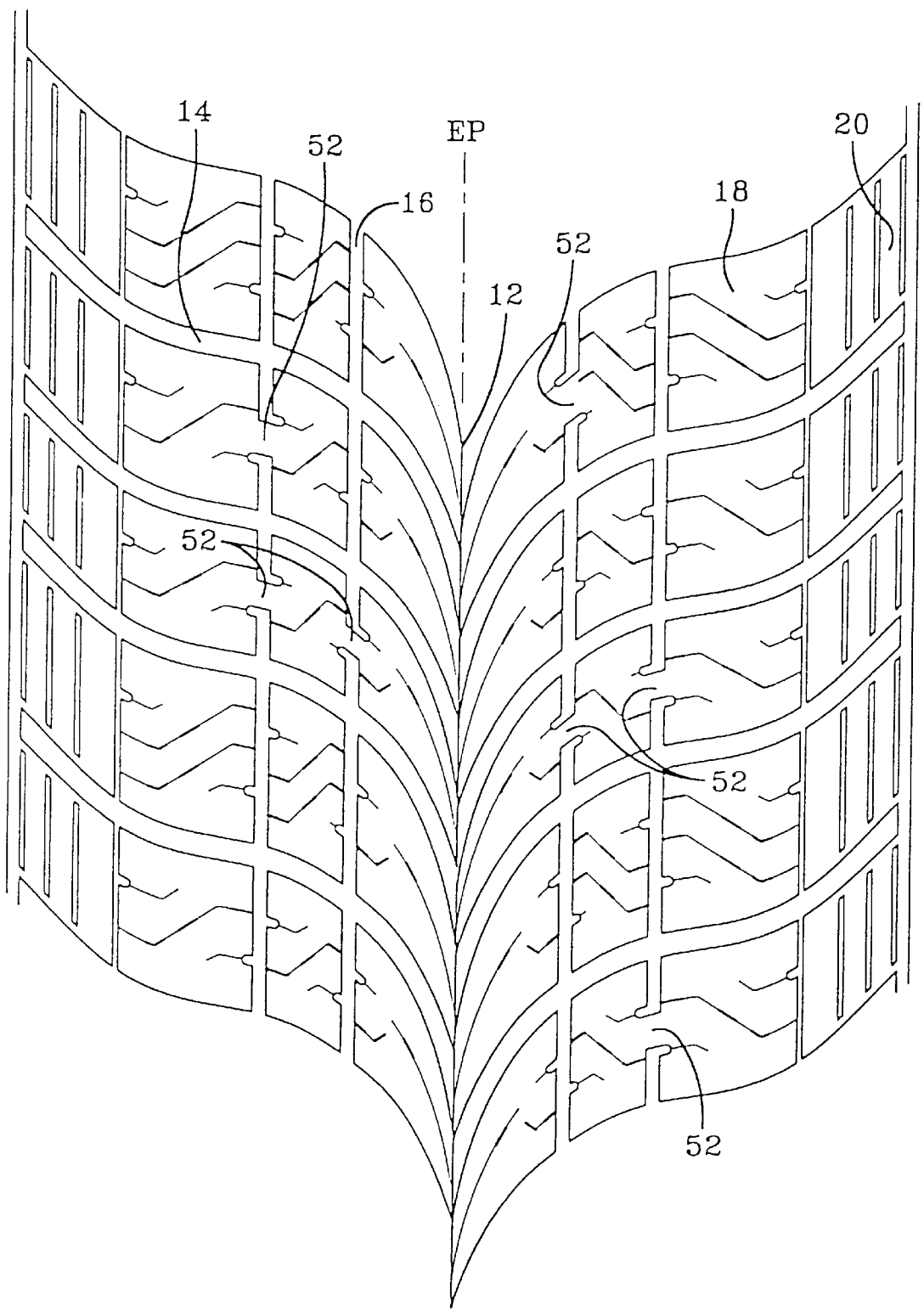
FIG. 5 illustrates a perspective view of an embodiment of the tire containing bridges.

Although groove wander and handling properties in a tire without bridges between the rows of lugs may be expected to be down as compared to tires having such bridges, the unobstructed circumferential grooves should be able to accommodate more water under wet conditions. With reference now to FIG. 5, in one embodiment of the invention, it may be possible to achieve a balance in properties by including bridges 52 between the rows of lugs at random, at every 7th to 12th lug circumferentially, to maintain groove wander characteristics, while nominally reducing hydroplaning properties when compared to the tire without bridges. In such an embodiment, some bridges may connect adjacent lateral lugs to provide a continuous lug from the shoulder to the center of the tire.

With reference now to FIG. 2, the carcass of the tire may comprise a high turn up ply 27 and a low turn up ply 29 to improve the stiffness of tire sidewall 22. In other embodiments, two high or two low turn-ups can be used, as long as the desired stiffness in the lower sidewall of the tire is achieved. In the embodiment where two low turn-ups are used, a chafer may be added.

The contour of the tread, as best illustrated in FIG. 2 is an approximation to a portion of a logarithmic spiral from the equatorial plane of the tire to that region of the tread which becomes the edge of the footprint. The curvature of the tire surface in the shoulder area of the tire, where the shoulder and the tread edge meet, is reduced precipitously, and outside the logarithmic progression, to reduce the mass of rubber in the non contact, shoulder portion of the tire. The logarithmic progression is maintained up to the portion of the tread that becomes the edge of the footprint. In the mold, the ratio of the radius of curvature $r_s$ of the tread corresponding to the edge of the footprint meeting the shoulder of the tire to the radius of curvature of the tread $r_c$ at the center of the tire is 0.024 to 0.044, preferably about 0.034, whereas the ratio of the radius of curvatue $r_m$ at the median of the tread half to the radius $r_c$ at the center of the tire is 0.28 to 0.48, preferably 0.38. Those skilled in the art will recognize that under inflation the tire will obtain a more level distribution. It is believed that this contour of the tread results in the desired footprint shape that gives good wear and handling properties. The reduced mass of the tire in the shoulder is believed to provide better high speed properties.

Theoretically, to obtain a logarithmic spiral of the contour of the tread, the rate of change in the radius of the tread should follow a progressive, mathematically described pattern for each point on the tread, but this would require the calculation of an infinite number of points. In practice, to approximate the logarithmic spiral, the tread can be divided into a number of portions, and a radius that fits the logarithmic spiral can be calculated for each portion. The larger the number of portions into which the tread is divided, the closer the contour of the tread will approximate a logarithmic spiral. In the illustrated embodiment, the tread is divided into three portions from the center of the tire to the tread region corresponding to the tread edge in the footprint.

With reference now to FIG. 3, it can be seen that the curved lateral groove 14 causes a natural pitch shift or boundary shift between each lug 18 in the tire. That is, the lugs are not lined up laterally. Since lugs 18 are slightly shifted relative to one another, the lugs enter the footprint during rotation of the tire at different times, and since it is believed that the entry and exit of a lug from the footprint is the primary cause of tire noise, it is believed that noise is dispersed.

It can also be seen that when a lug 18 enters a footprint as a tire rotates, a relatively small edge or point 40 enters the footprint first, leading the way for the larger land area 21 of the center of the lug. It is believed that the shape of the lug further reduces noise and irregular wear because the lug is eased or pried into the footprint by the small leading edge. The curved leading edges 28 of the lugs reduce or spread out the contact impact of the lug by its transitional loading.

It is believed that the noise of the tire can be further reduced by using a tread compound that undergoes a small amount of distortion or is slow to react or rebound either because of its stiffness or because of its relatively high hysteresis, which also reduces acceleration of a lug as it comes out of the footprint. Preferably, such a tread compound will retain good traction properties.

Although it is difficult to judge when one tread compound is better than another, because different compounds often have different properties on different surfaces, and tread compounds can be chosen for different desired properties, for a tire to be used on the highway on a broad range of paved surfaces, general utility on a number of surfaces is desireable. A broad range of tread compounds used for diffrent purposes are known to those skilled in the art.

A compound considered for use in the illustrated embodiment comprises the following Rubber Composition:

| Parts by weight per 100 parts rubber | Ingredients |
| --- | --- |
| 96.25 | Emulsion polymerization prepared styrene/butadiene copolymer elastomer (SBR) containing 23.5 percent styrene, oil extended (70 parts SBR + 26.25 parts oil). Obtained from The Goodyear Tire & Rubber Company as PLF 1712C. |
| 37.5 | Solution polymerization prepared cis 1,4-polybutadiene elastomer, oil extended (30 parts cis 1,4-polybutadiene elastomer + 7.5 parts oil). Obtained from The Goodyear Tire & Rubber Company as BUD 1254. |
| 70 | Carbon black, ISAF |
| 10 | Additional oil, aromatic |

Plus conventional amounts of zinc oxide, stearic acid, waxes, antidegradants, sulfur and both sulfenamide and tetrathiuram disulfide accelerators Conventional amounts of sulfur vulcanizing agents may vary from about 1.1 to about 1.5 phr, such amounts of antidegradants (including waxes) may vary from about 1 to 2 phr, such amounts of activators may vary from about from about 2 to 6 phr, and such amounts of accelerator may vary from about 1.1 to 1.4 phr. Specifically, the amount of zinc oxide may vary from about 1.5 to 2.5 phr, the amount of stearic acid may vary from about 2 to 3 phr, and the amount of waxes may vary from about 3 to 4 phr.

The rubber composition can conveniently be prepared by first mixing the ingredients exclusive of the sulfur and accelerator curatives in a nonproductive mix stage and the resultant mixture mixed with the sulfur and accelerator curatives in a productive mix stage as is conventional in the art as illustrated by U.S. Pat. No. 4,515,713.

The rubber composition may be vulcanized for about 18 minutes at about 150 degrees C.

Although other rubber formulations can be used in the tire of the invention, it is believed that properties of the above compound are exemplary of some desired properties for a candidate for a tread compound in a tire for all season use on an automobile or light truck. The above compound has the following properties.

modulus (300%) of about 5.5 MN/M$^2$ elongation of about 670% tensile strength of about 17 MN/M$^2$.

Since the carcass and belt of the tire are made of conventional materials, and are the same materials used in Eagle GT+4 Tires, and comprise 2 polyester carcass plies and 2 steel belts, it is believed that the stability of the footprint, despite the wide center groove, is due in part to lateral stability provided by the curved lateral grooves in the tread. The shape of the tread lugs causes each lug to interact with a large number of radial carcass cords. Each lug covers 1½ to 2½ times as many radial reinforcement cords as a non-curved lug of comparable width, and contact force is spread over a large area.

In preliminary testing of tires having the features described herein, it was found that for tires without bridges, groove wander characteristics, handling and hydroplaning properties were down slightly as compared to tires having bridges described in related applications. In a comparison of the same tires, the tires described herein had slightly better properties when worn 50%, significantly better wet slide properties at 60 mph, and slightly better noise properties. All other properties were substantially equivalent.

While specific embodiments of the invention have been illustrated and described, it will be recognized by those skilled in the art that the invention may be variously modified and practiced without departing from the spirit or scope of the invention. The invention is limited only by the following claims.

What is claimed is:

1. A radial ply pneumatic automobile tire for use on paved surfaces comprising a pair of annular beads, carcass plies wrapped around said annular beads, a tread disposed over said carcass plies in a crown area of said tire, and sidewalls disposed between said tread and said beads, wherein said tire has an aspect ratio of 0.35 to 0.8 and said tread has a footprint net-to-gross ratio of 40% to 70% and at least one annular center groove having a width of about 10% to 25% of total tread width based on the footprint of the tire at standard inflation and standard load, said annular center groove having a depth of 78% to 100% of total tread depth and a curvate U-shape, and lateral grooves intersecting circumferential grooves between said annular center groove and a shoulder, intersections of the circumferential grooves and the lateral grooves defining lugs wherein said lugs are traversed by sipes which improve traction and contain tie bars which stabilize the lug, and wherein an angle α of principle lug stiffness in each shoulder lug is ±80° to 90° in the top 25% of the lug with respect to the equatorial plane of the tire, wherein the ratio of a radius of curvature at the edge of the tread corresponding to the edge of the footprint to a radius of curvature at the equatorial plane of the tire is 0.024/1 to 0.044/1, wherein a circumferential edge of a lug is substantially bisected by a notch (44) which substantially parallels a sipe (17) in that portion of the lug and is substantially aligned with a sipe (17) in an adjacent lug (28), and wherein tie bars (38) are located near each change in direction of sipe (17).

2. The tire of claim 1 in which said lateral grooves are arcuate wherein no two lugs along a lateral groove are in lateral alignment.

3. The tire of claim 1 in which sipes and notches divide the circumferential edges of a lug into three or four parts, and the lug is divided through its central portion on an angle having a circumferential vector and a lateral vector, into two or three parts.

4. The tire of claim 1 in which two parallel sipes extend through a lug.

5. The tire of claim 1 in which said ratio is about 0.034/1.

6. The tire of claim 1 in which lugs (18) comprise a leading portion (37) and a trailing portion (39) which are separated laterally by a sipe (17) and wherein said sipe (17) changes direction in each lug at least twice so that in one circumferential edge (42) each lug has a leading portion which is wider than its concurrent trailing portion, and in the other circumferential edge (43) of the lug, the trailing portion is wider than the leading portion.

7. A radial ply pneumatic automobile tire for use on paved surfaces comprising a pair of annular beads, carcass plies wrapped around said annular beads, a tread disposed over said carcass plies in a crown area of said tire, and sidewalls disposed between said tread and said beads, wherein said tire has an aspect ratio of 0.35 to 0.80 and said tread has a footprint net-to-gross ratio of 40% to 70% and at least one annular center groove having a width of about 10% to 25% of total tread width based on the footprint of the tire at standard inflation and standard load, said annular center groove having a depth of 78% to 100% of total tread depth and a curvate U-shape, and lateral grooves intersecting circumferential grooves between said annular center groove and a shoulder, intersections of the circumferential grooves and the lateral grooves defining lugs wherein said lugs are traversed by sipes which improve traction and contain tie bars which stabilize the lug, and wherein an angle $\alpha$ of principle lug stiffness in each shoulder lug is ±80° to 90° in the top 25% of the lug with respect to the equatorial plane of the tire, and wherein the circumferential length of lug segments in all the lugs are within 55% of each other, lugs (18) comprise a leading portion (37) and a trailing portion (39) which are separated laterally by a sipe (17) and wherein said sipe (17) changes direction in each lug at least twice so that in one circumferential edge (42) each lug has a leading portion which is wider than its concurrent trailing portion, and in the other circumferential edge (43) of the lug, the trailing portion is wider than the leading portion, and wherein the ratio of a radius of curvature at the edge of the tread corresponding to the edge of the footprint to a radius of curvature at the centerline of the tire is 0.024/1 to 0.044/1.

8. The tire of claim 7 in which sipes and notches divide the circumferential edges of a lug into three or four parts, and the lug is divided through its central portion on an angle having a circumferential vector and a lateral vector, into two or three parts.

9. The tire of claim 8 in which sipes that do not extend through the lug are increased in length in larger lugs as compared to such sipes in smaller lugs, and are shorter in smaller lugs as compared to such sipes in larger lugs, and are positioned together with sipes that extend through the lugs to form lug portions of similar length regardless of the size of the lug.

* * * * *